United States Patent

Ashby et al.

[11] Patent Number: 6,081,803
[45] Date of Patent: Jun. 27, 2000

[54] SUPPORT FOR ALTERNATIVE NAMES IN A GEOGRAPHIC DATABASE USED WITH A NAVIGATION PROGRAM AND METHODS FOR USE AND FORMATION THEREOF

[75] Inventors: Richard A. Ashby, Blue River, Wis.; David S. Lampert, Highland Park, Ill.

[73] Assignee: Navigation Technologies Corporation, Rosemont, Ill.

[21] Appl. No.: 09/019,684

[22] Filed: Feb. 6, 1998

[51] Int. Cl.[7] .................................................. G06F 17/30
[52] U.S. Cl. .................................. 707/4; 707/100; 704/8; 340/990; 340/995
[58] Field of Search ............................... 707/1–3, 4, 200, 707/100; 704/8.2, 2–4, 7; 701/209, 200–201, 208, 213; 340/990, 995

[56] References Cited

U.S. PATENT DOCUMENTS

| | | | |
|---|---|---|---|
| 4,888,698 | 12/1989 | Drissen et al. | 701/200 |
| 4,907,159 | 3/1990 | Mauge et al. | 701/117 |
| 5,214,793 | 5/1993 | Conway et al. | 455/500 |
| 5,465,088 | 11/1995 | Braegas | 340/905 |
| 5,487,002 | 1/1996 | Diller et al. | 701/1 |
| 5,543,789 | 8/1996 | Behr et al. | 340/995 |
| 5,784,691 | 7/1998 | Rühl | 455/186.1 |
| 5,797,112 | 8/1998 | Komatsu et al. | 701/201 |
| 5,835,854 | 11/1998 | Palisson et al. | 455/186.1 |
| 5,864,305 | 9/1999 | Rosenquist | 340/905 |

*Primary Examiner*—Hosain T. Alam
*Attorney, Agent, or Firm*—Frank J. Kozak; Lawrence M. Kaplan

[57] ABSTRACT

A method and system for supporting alternative names of geographic locations with a navigation application program that uses a geographic database stored on a computer-readable medium. The alternative names of geographic locations include names in a plurality of different languages. Included are one or more language filters. Each of the one or more language filters associates the data records in the geographic database that are used as names for geographic locations with one or more of the plurality of different languages. A routine uses the one or more language filters so that the navigation application program can use names for geographic locations that are valid in an access language selected from among the plurality of different languages.

12 Claims, 6 Drawing Sheets

| POI RECORD | |
|---|---|
| NAME | 126 |
| STREET | 127 |
| POSTAL CODE | 128 |
| LOCATION | 129 |
| FACILITY TYPE | 130 |
| CHAIN ID | 131 |
| COORDINATES | 132 |
| ADMIN. ZONE | 133 |
| PHONE NUMBER | 134 |
| (OTHER DATA) | 135 |
| ID | 136 |

| PLACE RECORD | |
|---|---|
| NAME | 145 |
| AREA | 147 |
| LEVEL | 148 |
| ANCESTORS | 149 |
| TYPE | 150 |
| OFFICES | 151 |
| VANITY ZONE | 152 |
| POSTAL CODE | 153 |
| PHONE NUMBER | 155 |
| BASE NAME | 156 |
| ALTERNATIVE NAMES | 157 |
| (OTHER DATA) | 158 |
| ID | 159 |

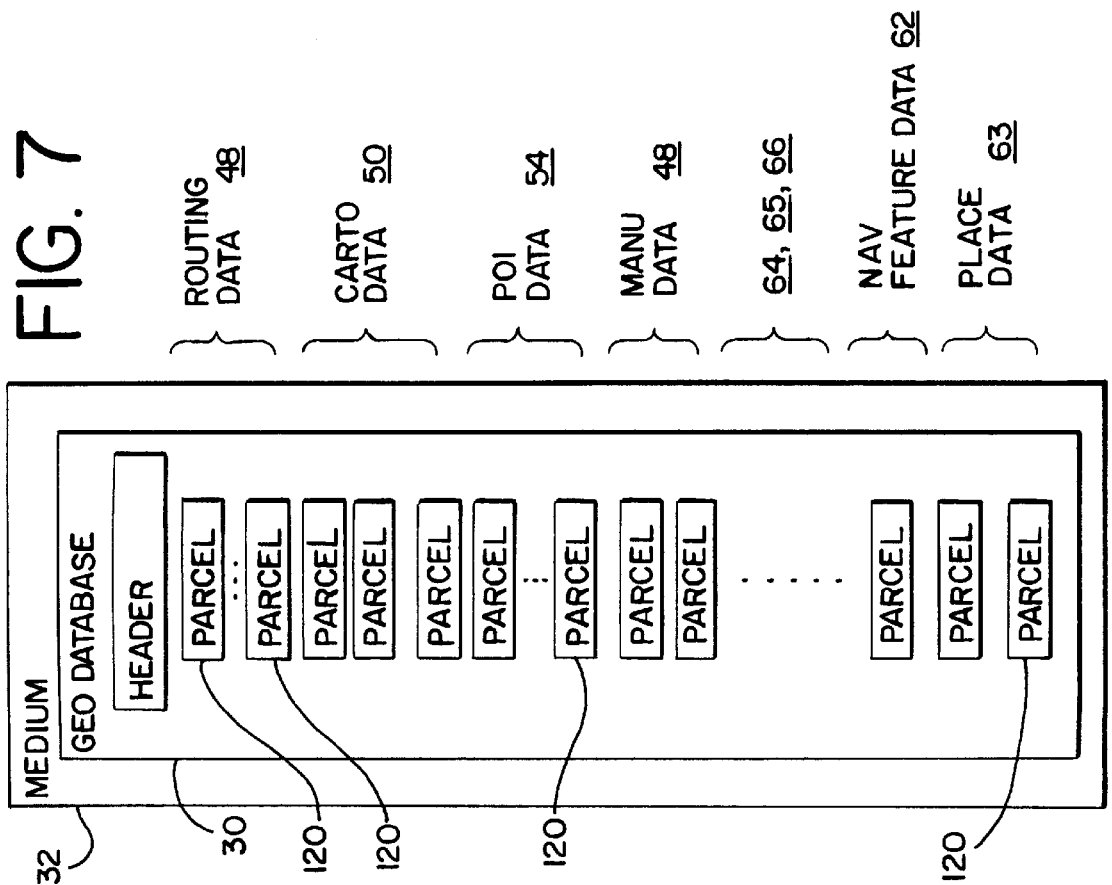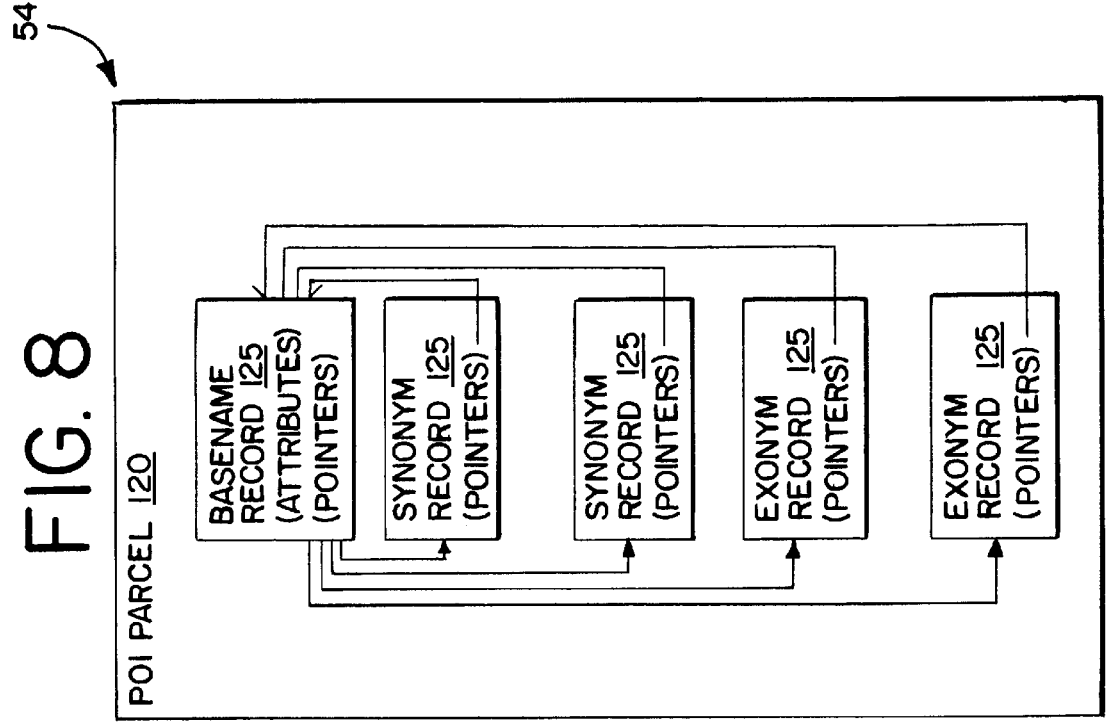

SUPPORT FOR ALTERNATIVE NAMES IN A GEOGRAPHIC DATABASE USED WITH A NAVIGATION PROGRAM AND METHODS FOR USE AND FORMATION THEREOF

BACKGROUND OF THE INVENTION

The present invention relates to navigation systems and geographic databases used with navigation systems, and more particularly the present invention relates to providing support in a navigation system or navigation application used therein for multiple names of geographic locations, such as places and/or points of interest, including names in more than one language.

Computer-based navigation systems are available that provide end-users with various navigating functions and features. For example, some navigation systems are installed in vehicles and are able to provide end-users (i.e., drivers of the vehicles) with optimum routes to travel by roads between locations. Using input from the end-user, and optionally from equipment that can determine one's physical location (such as a GPS system), a navigation application program in the navigation system can examine various routes between two locations to determine an optimum route to travel from a starting location to a destination location in a geographic region. The navigation application program may then provide the end-user with information about the optimum route in the form of instructions that identify the maneuvers required to be taken by the user to travel from the starting location to the destination location. If the navigation system is located in an automobile, the instructions may take the form of audio instructions that are provided along the way as the user is traveling the route. Some navigation application programs are able to show detailed maps on computer displays illustrating routes to destinations, the types of maneuvers to be taken at various locations along the routes, locations of certain types of features, and so on.

In order to provide these and other navigating functions, the navigation system or application requires one or more detailed databases that include data which represent physical features in a geographic region. The detailed database may include data representing the roads and intersections in a geographic region and also may include information about the roads and intersections in a geographic region, such as turn restrictions at intersections, speed limits along the roads, street names of the various roads, address ranges along the various roads, and so on.

One of the difficulties that is encountered in providing information to end-users using navigation systems is accommodating multiple names for locations, such as points of interest or other places. Many locations are known by more than one name. Thus, when an end-user requests information from a navigation system or when a navigation system provides information to an end-user, it would be preferable that the navigation system be able to accommodate the different names by which some locations are known. Another difficulty associated with providing information to end-users using navigation systems relates to providing information in the end-user's preferred language. In order to provide an end-user using a navigation system with meaningful information, the information should be provided to the end-user in the end-user's preferred language. However, many locations are known by different names in different languages. For example, the country "Germany" in English is known as "Deutschland" in German and "Allemande" in French. Providing navigation information to an end-user in the end-user's preferred language can be difficult when a navigation system is installed in a rental vehicle. Rental vehicles may be used by persons from other countries many of whom speak different languages. Thus, it would be preferable that the navigation system support use of different languages.

Although providing support for alternative names for locations and providing support for multiple languages would be desired, these features can be difficult to provide given the constraints imposed by the relatively limited resources of many navigation systems. Computer-based navigation systems are provided on various platforms including some with relatively limited computer hardware resources. For example, navigation systems may be located in vehicles or may be hand-held. These types of navigation systems may have relatively limited computer resources, such as limited memory and relatively slow I/O. In order to provide a high a level of functionality in such systems, it is required that the available computer resources be used efficiently. Due to the limited memory resources of these navigation systems, it is necessary to load geographic data as needed from a storage medium, such as a CD-ROM, into the memory of the navigation system for use by the navigation application program. Unfortunately, in these types of systems, I/O access from a storage medium may also be relatively slow. Thus, the relatively limited memory resources combined with the relatively slow I/O can limit the performance of some types of navigation systems, resulting in slow response. Aside from being undesirable, slow response in a navigation system may render the system useless for its intended purpose in certain circumstances. For example, if the navigation system is installed in a vehicle, the driver may require information from the navigation system about a desired route in a matter of seconds in order to utilize the information while driving. If the navigation system requires more than several seconds to calculate a route, the driver may have moved beyond the point at which the routing information provided by the navigation system is relevant. Therefore, it is important that navigation systems operate efficiently in order to provide navigating information relatively quickly.

Techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system. Included among the techniques that can be used to facilitate the use of geographic data by navigation systems is parcelization. When data are parcelized, the plurality of data records that together comprise the geographic data are grouped together into separate groups or parcels. Another way that geographic data can be organized to facilitate their use is to organize the data spatially. When geographic data are organized spatially, features that are close together physically in the geographic region are represented by data records that are physically (or logically) close together in the database. Geographic data can be both parcelized and spatial organized to take advantage of both these techniques.

Although techniques such as parcelization and spatial organization can enhance the use of geographic data by a navigation system, use of these techniques may be accompanied by some drawbacks. For example, use of these techniques can make it difficult to accommodate alternative names for locations. In addition, use of these techniques can make it difficult to accommodate multiple languages.

Accordingly, there continues to be a need for improvement in the formation of geographic databases and the programming that uses them in order to provide better performance in navigation systems.

Navigation application programs may also be run on computer platforms that have relatively more memory resources and faster I/O, such as personal computers or networks. Although these platforms may have more and faster resources, the considerations related to the efficient use of geographic data still apply, but on a different scale. With these types of platforms, even greater functionality can be provided if the geographic database can be formed and used efficiently.

Accordingly, it is an objective to provide improvements in the storage and/or use of geographic data, and/or the programming that uses the geographic data, to accommodate and support alternative names for locations in a geographic region.

SUMMARY OF THE INVENTION

To achieve the foregoing and other objectives and in accordance with the purposes of the present invention, a method and system are provided for supporting alternative names of geographic locations with a navigation application program that uses a geographic database stored on a computer-readable medium. The alternative names of geographic locations include names in a plurality of different languages. Included are one or more language filters. Each of the one or more language filters associates data records in the geographic database that are used as names for geographic locations with one or more of the plurality of different languages. A routine uses the one or more language filters so that the navigation application program can use names for geographic locations that are valid in an access language selected from among the plurality of different languages.

BRIEF DESCRIPTION OF THE DRAWINGS

FIG. 7 is a diagram showing the arrangement of parcels of data in the geographic database of FIG. 3 according to the parcelization method illustrated in FIG. 6.

FIG. 8 is a diagram illustrating several point of interest records in one of the parcels shown in FIG. 7.

DETAILED DESCRIPTION OF THE PRESENTLY PREFERRED EMBODIMENTS

I. Overview

According to a present embodiment, support is provided for alternative names for locations in a geographic region using a navigation application that uses a computer readable geographic database. These alternative names may include different names by which the same location is known in different languages as well as different names by which the same location is known in the same language. The locations for which alternative name support is provided include both points of interest and places. This support is provided while implementing other techniques in the geographic database that facilitate efficient use of navigation system resources. This enables support for alternative names for locations while maintaining desired navigation system performance characteristics.

Support for alternative names for locations using a navigation system is provided, in part, by a combination that includes improvements in the storage, arrangement, and/or structuring of the geographic data used by the navigation system to facilitate the use of the data by one or more of the functions in a navigation application program in the navigation system that uses the data. Based upon the manner in which the geographic data are stored, arranged, and/or structured, functions in the navigation application program that access the data can implement a routine that exploits the improvements incorporated into the geographic data in order to support alternative names for locations.

II. Navigation System—Overview

Figure 1:
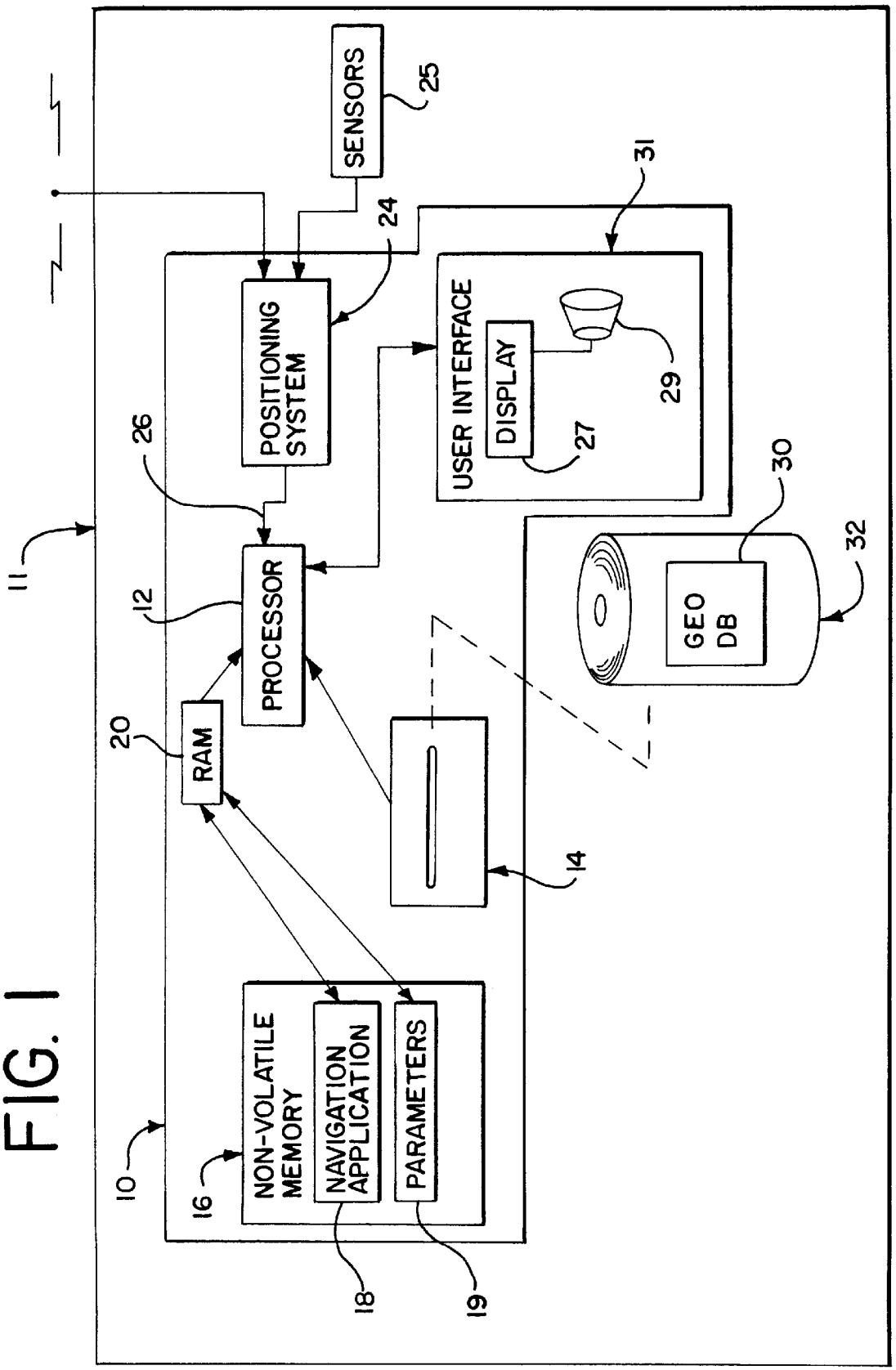
FIG. 1 is a block diagram illustrating a navigation system.

Referring to FIG. 1, there is a block diagram of a navigation system 10. The navigation system 10 is installed in a vehicle 11, such as a car or truck, although in alternative embodiments, the navigation system 10 may be located outside of a vehicle or may be implemented in various other platforms or environments, as described below.

Referring to the embodiment illustrated in FIG. 1, the navigation system 10 is a combination of hardware and software components. In one embodiment, the navigation system 10 includes a processor 12, a drive 14 connected to the processor 12, and a non-volatile memory storage device 16 for storing a navigation application software program 18, as well as other information, such as configuration parameters 19. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, may also be suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the speed, direction, and so on, of the vehicle. The positioning system 24 may also include appropriate wireless communication technology to obtain a GPS signal, in a manner which is known in the art. The positioning system 24 outputs a signal 26 to the processor 12. The signal 26 may be used by the navigation application software 18 that is run on the processor 12 to determine the location, direction, speed, etc., of the navigation system 10.

The navigation system 10 also includes a user interface 31. The user interface 31 includes appropriate equipment that allows the end-user to input information into the navigation system. This input information may include a request to use the navigation features of the navigation system. For example, the input information may include a request for a route to a desired destination. The input information may also include other kinds of information, such as configuration information for selection of a preferred access language, as explained further below. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 30 stored on a storage medium 32. The storage medium 32 is installed in the drive 14 so that the map database 30 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 32 on it can be updated easily.

In one embodiment, the storage medium 32 is a CD-ROM disc. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future. The storage medium does not have to be physically provided at the location of the navigation system. In alternative embodiments, the storage medium upon which some or all of the geographic data are stored may be located remotely from the navigation system and the information provided to the navigation system via a communications link.

Figure 2:
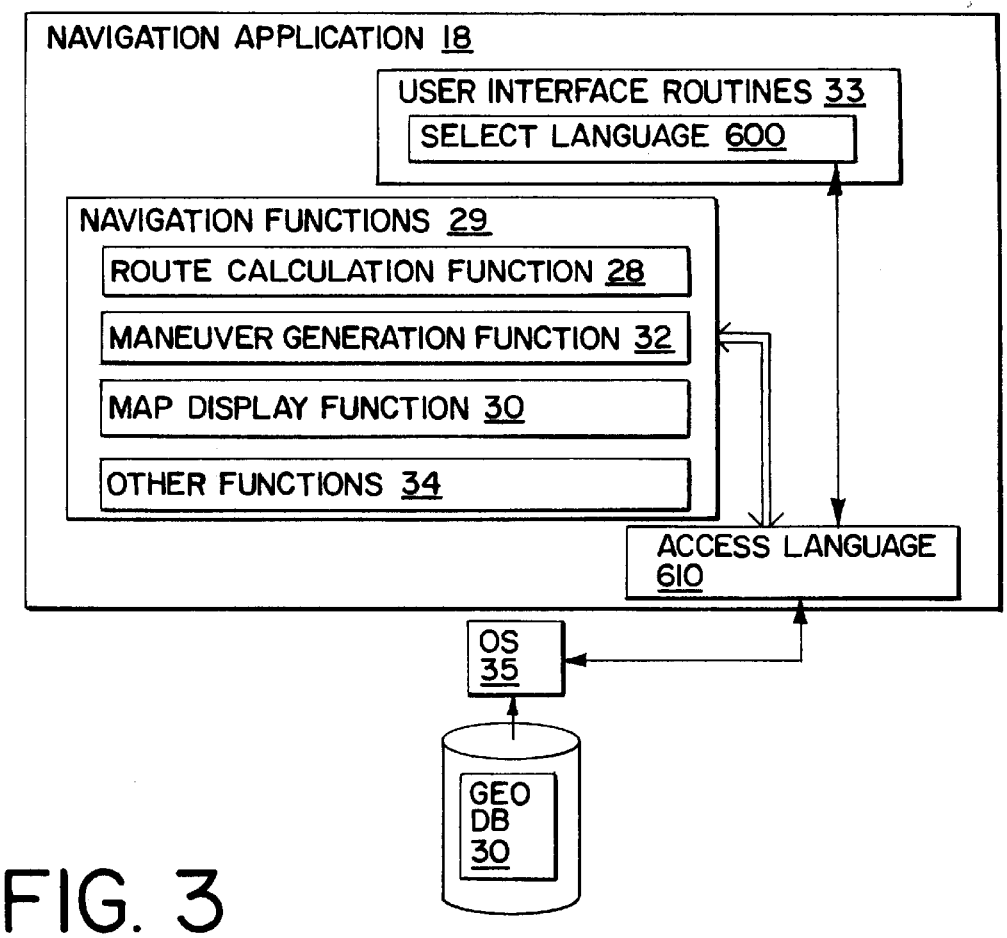
FIG. 2 is a block diagram illustrating parts of the navigation application software of FIG. 1.

Referring to FIG. 2, the navigation application 18 includes software programming that provides separate navigation functions (or subprograms) 29. These navigation functions 29 include, for example, a route calculation function 28, a map display function 30, and a route guidance function 32 (wherein detailed directions are provided for reaching a desired destination). The navigation application program 18 may include other functions or subprograms 34 in addition or alternatively to these, such as a vehicle positioning (e.g., map matching) function. Although these navigation application functions 29 are represented as separate subprograms or applications within the navigation application program 18, these functions 29 may be combined or otherwise provided. The navigation application program 18 also includes user interface programming 33 that supports the user interface 3 (in FIG. 1). For example, this user interface programming 33 may provide for the graphical display of information to the end-user via the user interface 31, the display of menus, prompts, and so on. The navigation system 10 may also include an operating system program 35.

III. Geographic Database—Overview

Figure 3:
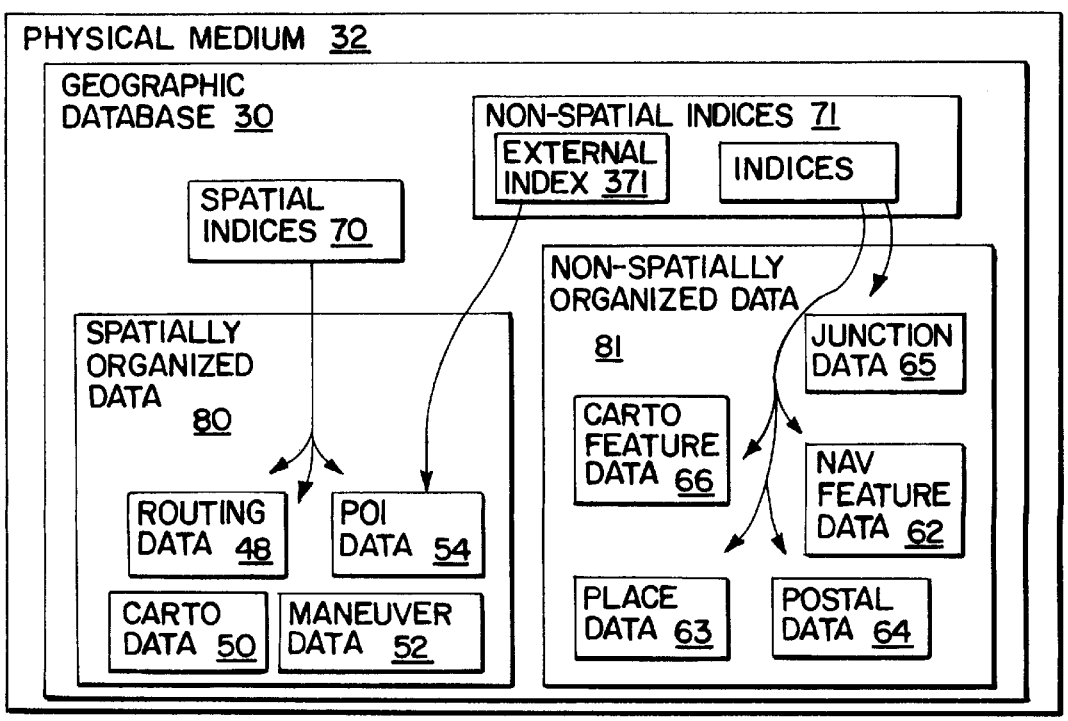
FIG. 3 is a block diagram illustrating parts of the geographic database on the storage medium of FIGS. 1 and 2.

FIG. 3 illustrates the storage medium 32 having the geographic database 30 stored thereon. The various navigation functions 29 in FIG. 2 in the navigation application program 18 use portions of the (geographic data 30 from the medium 32 in order to provide useful navigation features to the end-user of the navigation system 10. The geographic data 30 are in the form of one or more computer-readable data files or databases. The geographic data 30 may include information about the positions of roads and intersections in or related to a specific geographical region, and may also include information about the attributes of the roads and intersections, such as one-way streets and turn restrictions, as well as other information, such as street addresses, alternative routes, hotels, restaurants, museums, stadiums, offices, automobile dealerships, auto repair shops, etc. The region may include a metropolitan area, such as Chicago and its suburbs, New York and its suburbs, Los Angeles and its suburbs, or alternatively, the regional area may include an entire state, such as California, an entire country, such as the United States, or more than one country, such as Germany, France, and Italy, or combinations of these. More than one region may be stored on a storage medium.

One way that the accessing of geographic data 30 can be enhanced for performing various navigation functions is to provide separate collections or subsets of the geographic data for use by the separate functions 29 in the navigation application program 18. Each of these separate subsets is tailored specifically for use by one or more of the navigation functions 29. For instance, the route calculation function 28 normally uses only portions of all the information in the geographic database that are associated with a segment of a road. Thus, when the route calculation function 28 is being run, it may require information such as the speed along a road segment, turn restrictions from one road segment to another, and so on. However, the route calculation function 28 does not normally require the name of the road to calculate an optimum route. Similarly, when using the map display function 30, some of the information associated with a road segment, such as the speed limits or turn restrictions, is not required. Instead, when the map display function 30 is run, it uses only a portion of the information associated with the road segment, such as the shapes and locations of roads, and possibly the names of the roads. Likewise, when the maneuver function 32 is being run, some of the information associated with a segment of a road, such as the speed and turn restrictions, is not required. Instead, when the maneuver function 32 is being run, it uses information that includes the name of the road represented by the road segment, the address range along the road segment, any signs along the road segment, and so on. Although there may be some overlap as to the types of information used by the various navigation functions 29, some of the data used by any one of these navigation functions is not used by another of the functions. If all the information relating to each geographic feature were associated with it as a single data entry in a single database, each data entity record would be relatively large. Then, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

To facilitate performance of the navigation system, the geographic data 30 includes separate subsets of data for various functions. Specifically, these separate subsets include routing data 48, cartographic data 50, maneuver data 52, point-of-interest data ("POI") 54, navigable feature data 62 (e.g., street names), place data 63 (e.g., administrative areas and zones), junction data 65, postal code data 64, and cartographic feature data 66. Other kinds or groupings of data, in addition to these, may be included as well. In one present embodiment, all of these subsets of data are in one file, although alternatively they may be included in more than one file.

Each subset of data includes only the data required to be used by a particular navigation function. There may be some overlap of data between some of these subsets, with the result that some parts of the information may be included in more than one subset. For example, both the routing data 48 and the cartographic data 50 may include attributes identifying the nodes located at the ends of road segments, Although this duplication may result in an larger overall data storage requirement, each of the navigation programs benefits from the resultant efficiency of handling smaller amounts of data.

Providing for separate subsets of geographic data for each of the navigation functions also takes into account that usage of each of these navigation functions relates to the others of the navigating functions in expected ways. For example, an end-user will often first want to view a present position, then enter a destination, then receive instructions how to start toward the destination, then observe a map showing the initial portion of the route, then receive further instructions, then have a map displayed of the next portion of the route, and so on. Because of this type of expected usage, dividing the data into subsets provides for efficient use of the data when using each separate function.

Although the division of the geographic data into subsets provides for efficient use of the data by the different navigation functions 29 it becomes necessary to provide that the different navigating functions that use these different subsets of the data be able to work together. For example, after an end-user obtains a calculated route, it may be desired to display a map on a computer display with the calculated route highlighted. In order to accomplish this, the routing subset of geographic data is accessed first to obtain the routing road data for the optimum route, and then the cartographic subset of the geographic database is accessed to obtain the cartographic data corresponding to the routing data. To permit these data subsets to work together, indices are included. Referring to FIG. 3, these indices may include both spatial indices 70 and non-spatial indices 71. These indices 70 and 71 may include various kinds of tables, cross references, and search trees (including B-trees and kd-trees), as well as other data finding techniques. These indices 70 and 71 may be located separately from the subsets of the data or alternatively may be located among the data. The physical organization represented in FIG. 3 is independent of the type of media used, and it is recognized that the implementation of the organization represented in FIG. 3 will take into account the specific features associated with various different types of physical media, such as CD-ROM disc, PCMCIA card, etc.

As mentioned above, included among the types of data are point of interest data 54 and place data 63. These two kinds of data are used to describe kinds of named locations in the geographic region represented by the geographic database 30.

Point of interest ("POI") data 54 are comprised of point of interest ("POI") records or entities. Each POI entity is used to store information about a point of interest. Points of interest are single points or areas that may be known by name rather than address. Points of interest may be used as origins or destinations for a route and can be categorized by type, such as airport, city center, hotel, etc. Each point of interest in the geographic region is represented by at least one point of interest record. However, there may be more than one point of interest record that represents each point of interest, as explained below.

Figures 4, 5, 6:
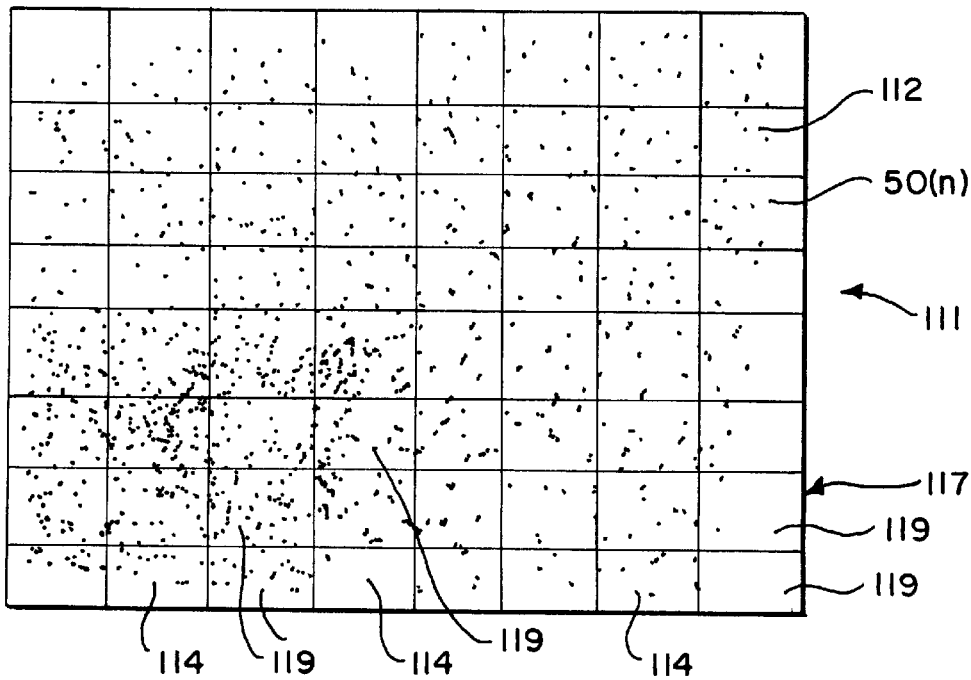
FIG. 4 is a diagram illustrating the kinds of data included in a point of interest record included among the point of interest data of FIG. 2.
FIG. 5 is a diagram illustrating the kinds of data included in a place record included among the place data of FIG. 2.
FIG. 6 shows a map of a geographic region used to illustrate application of a parcelization method to spatially organized geographic data.

FIG. 4 is a diagram illustrating the kinds of data that may be included in or associated with a point of interest data record (or entity) 125. A point of interest is associated with a location 129 along a road segment. This provides a navigable destination which leads to the point of interest. As shown in FIG. 4, in addition to its location 129 along a road segment, each point of interest record 125 may include the following information (or attributes) about the point of interest that it represents: the name 126 of the point of interest; the street address 127, the postal code 128; a POI type 130 (e.g., airport, city center, hotel, etc.); a chain identification number 131, if applicable (e.g., "McDonalds's, "Hilton", etc.); the geographical coordinates 129 (e.g., the longitude and latitude to identify the actual location of the point of interest); the administrative zone 133 (e.g., "Chicago", "Ill.", etc.); the phone number 134; and optionally, additional information 135. The point of interest data record 125 also contains a unique identifier 136 for the point of interest.

Points of interest may be associated with each other. Each point of interest data record that is associated with another point of interest data record may include a pointer or other data structure to reference the associated point of interest record. For example, a stadium with east and west parking lots may have a separate point of interest record for each parking lot and a separate point of interest for the stadium itself. Related points of interest may be organized in a parent-child relationship. A parent point of interest may have more than one children points of interest, and likewise a child point of interest may have more than one parent point of interest. Additional data and/or cross referencing may be included in the point of interest data records to support these kinds of associations between points of interest.

Place data 63 are comprised of place records or entities. Each place entity is used to store information about a named place. Named places can be categorized as administrative areas or zones. Administrative areas are hierarchical governmental entities such as country, state, and city in the United States, or country, Bundesland, Freis, municipality, and settlement in Germany. Other countries can have different entities assigned to levels of places. Zones are named places that fall outside of the governmental hierarchy, such as townships or neighborhoods. FIG. 5 is a diagram illustrating the kinds of data that may be included in or associated with a place data to record (or entity) 145. These data associated with the place data record may be attributes of the place data record 145. Referring to FIG. 5, the place entity 145 contains the name 146 of the place, the names of all the parent administrative levels 149 of the place, and the geographical coordinates that define the area in which the place is located 147. The place record 145 may also include attributes similar to those that describe points of interest, mentioned above. The place entity 145 may also contain a unique identifier 159 for the place. One reason that places are treated as separate entities is to enable points of interest to be directly associated with a place. This facilitates the ability to query points of interest and navigable features by place.

IV. Spatial Access to Geographic Data

Referring again to FIGS. 2 and 3, organizing the data into subsets or types provides separate collections of the data in sizes that are more manageable by each of the navigation functions 29 in the navigation application program. With respect to some subset types, the data can be further organized to facilitate spatial access.

Several of the navigation functions 29 in a navigation application 18 may require access to the geographic data spatially. One way this arises is that a function in a navigation application program 18 requires finding a data entity record in the geographic database 30 given the physical location represented by the data entity in the geographic region. The data entity may be a road segment record that represents a portion of a road in the geographic region and the function may require finding the road segment record based upon the physical location in the geographic region of the portion of the road represented by the road segment record. The data entity may be a POI record that represents a hotel closest to the present position of a vehicle in which the navigation system is installed. Another way spatial access arises is when a function in a navigation application program requires finding several or all of a type of data records located close to a location in the geographic region or within a defined area in the geographic region. For example, a function may require all restaurant POI records encompassed within a rectangle defined by geographical coordinates (x, x+n) latitude and (y, y+m) longitude. Referring to FIG. 2, the route calculation function 28, the map display function 30, and the maneuver generation function 32 are functions that may require access to geographic data spatially. Other functions may also require access to data spatially.

Referring again to FIG. 3, some of the subsets of geographic data (indicated at "80") are organized spatially and other subsets of data (indicated at "81") are organized in a manner other-than-spatially. Spatially-organized data are arranged so that the data that represent geographically proximate features are located logically and/or physically proximate in the data set 30 and/or on the medium 32. For some of the navigation application functions, spatial organization of their respective data provides for reading closely related geographic data from the medium more quickly and loading related geographic data into memory where they can be used. This kind of organization minimizes accessing of the storage medium 32 and speeds up operation of these navigation functions.

The subsets 80 of the geographic data that are organized spatially include the route calculation data 48, the cartographic data (map display) 50, the maneuver data 52, and the points-of-interest data 54. Other kinds of data may also be organized spatially. Spatial organization can be applied to the data in different ways. For example, spatial organization can be applied to each record of data or can be applied to groupings of pluralities of data records (e.g., such as parcels of data, as explained below).

Some of the subsets 81 of the data are organized and accessed in ways other than spatially. The non-spatially organized data 81 include navigable feature data 62, place data 63, postal code data 64, crossroads/junction data 65 and cartographic feature data 66. Third-party data 61, if present, are not organized spatially. Each record of the third-party data 61 may be associated with a record in the POI data 54. Since POI data 54 are organized spatially, spatial access to third-party data 61 can be achieved via their associated POI data 54.

V. Parcelization of Geographic Data

There are several factors that can affect the operation and performance of a navigation application program when using geographic data. In order to provide a reasonably high level of functionality, a relatively large database may be provided. Storage media, such as CD-ROM discs or PCM-CIA cards, are capable of handling databases of the size and complexity sufficient to provide suitable functionality. However, accessing these types of media can be relatively slow. Because navigation systems may be installed in vehicles, or may be hand-held, the hardware resources of the navigation system may be limited. Navigation systems installed in vehicles or handing held units may have limited memory resources and relatively slow media access rates. Even when navigation applications are provided on platforms that have greater memory and hardware resources, similar considerations apply, but at a different scale.

Assuming that all the data records for a given entire geographic region cannot be loaded into the memory of the navigation system at the same time, due to limited memory resources of the navigation system in which the navigation application program is being run, it would be desirable to load into memory only those data that are needed to perform a desired function. In order to accomplish this, data in the geographic database 30 are organized into parcels. A parcel of data is established to be the smallest quantity of data that can be accessed at a time. This may relate to the quantity of data that can be accessed in a single disk access, although it may be related to some other factor. For some types of media such as a CD-ROM discs, a parcel may be established to be a 16 Kilobyte quantity of data. (Other sizes of data may be used including 1 K, 2 K, 4 K, 8 K, 32 K, and so on.)

A. Parcelization of spatially organized data.

In parcelizing data, it is preferable generally to form parcels of data in a manner that minimizes the number of parcels that have to be accessed and read in order to perform a navigation function. As mentioned above, it is sometimes desirable to store the data representing (geographic features based upon the physical proximity of the features. With respect to the spatially organized data, it would be advantageous to provide a means to load data into memory based generally upon the physical geographic locations of the features which the data represent or upon the geographical proximity of the features which the data represent. This can be done by parcelizing the data so that they are organized in the database and/or on the medium based upon the geographic locations of the features which are represented by the data.

There are a number of different procedures that can be used for parcelizing geographic data. For example, a simple parcelization method may provide for separating the geographic data into a plurality of parcels wherein the data in each parcel represent features encompassed within a separate one of a plurality of regular sized rectangles which together form a regular, rectangular grid over the geographic region. Another method for parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the application Ser. No. 08/740,295, filed Oct. 25, 1996, now U.S. Pat. No. 5,968,109 the entire disclosure of which is incorporated by reference herein, and parcelization procedures are also described in the copending patent application entitled "METHOD AND SYSTEM FOR FORMING AND USING GEOGRAPHIC DATA" filed Sep. 5, 1997, now U.S. Pat. No. 5,953,722 the entire disclosure of which is incorporated by reference herein. Still another method of parcelization to which the disclosed subject matter can be applied is described in U.S. Pat. No. 4,888,698.

For purposes of forming the data into parcels, the data are first separately organized into the different types based upon the functions that access them, such as routing, map display, and route guidance. Parcelization of spatially organized data is illustrated with reference to FIGS. 6 and 7. FIG. 6 shows a map 111 of a geographic region 112. A plurality of positions 114 (represented by the dots or points) are shown to be located on the map 111. Each of the positions 114 represents a place or point in the geographic area 112 at which there is located a feature about which information is included in the geographic database 30 of FIGS. 1 and 3. For example, the positions 114 may correspond to the physical locations of end points of road segments, points along road segments, points-of-interest (such as hotels, civic centers. etc.), and so on, which are represented by the data in the geographic database 30. Each of these locations 114 has a unique physical location (latitude, longitude, and optionally absolute or relative altitude) and each of the locations 114 can be uniquely identified by its two dimensional (or three dimensional) geographic coordinates (i.e., latitude, longitude, and optionally altitude).

In FIG. 6, a grid 17 overlays the geographic region 12 represented by the map 111. The grid 117 divides the geographic region 112 into a plurality of rectangular areas 119. These rectangular areas 119 may be all the same size or may have different sizes depending upon the procedure used for parcelization. The grid lines of the grid 117 represent the boundaries of rectangular areas 119. The locations of the boundaries may depend on the parcelization procedure used. In general, when using any of the procedures for spatial parcelization, the data records of a particular type of data which represent features that are encompassed within each rectangular area 119 are grouped together in a separate parcel of data. Therefore, each parcel of a spatially organized data type includes data records that represent features that are encompassed by a separate one of the plurality of rectangular areas 1 19. As shown in FIG. 7, the parcel 120 is then stored to form the database 30 so that the data in each parcel 120 are logically and/or physically grouped together. Since the parcel represents the smallest quantity of data that can be accessed at a time by the navigation system, when a parcel of data is accessed, all of its data records are read into the memory of the navigation system at the same time. With reference to the map 111 of FIG. 6, this means that all the data records of a spatially organized type of data encompassed within each rectangle 119 are accessed together as a group. It can be appreciated that for certain kinds of navigation functions, having in memory all the records that represent features that are close together is desirable.

POI data 54 are among the kinds of data that are spatially parcelized. The POI data 54 may be parcelized in the same way as the other parcel types (e.g., routine data 48, cartographic data 50, and so on). Accordingly, each parcel 120 of POI data 54 (in FIG. 7) includes one or more POI data records 125 (as shown in FIG. 4) which represent the points of interest encompassed within a separate one of the plurality of rectangles 119 (as shown in FIG. 6).

As the parcels 120 are formed for all the types of data, the parcels are ordered. Various types of ordering may be used. In general, it is preferred that the parcels be ordered in a manner that minimizes searches for data. One way to order spatially organized parcels is to use a depth-first ordering from a kd-tree index within each parcel type. This provides an ordering similar to Peano-key ordering. Parcels may be stored on disk (i.e., medium 32 in FIGS. 1 and 3) in this approximate Peano key order. An index in the form of a kd-tree (included among the spatial indices 70 in FIG. 3) can be used to access parcels spatially. This index is useful for initial location of an arbitrary position, such as when a program in a navigation system initially locates the map data corresponding to a current vehicle position.

A spatial index (kd-tree) may be used to search for POI parcels within a given geographic region. The spatial index may be included among the spatial indices 70 of FIG. 3.

B. Parcelization of non-spatially organized data.

As mentioned above, some kinds of data (identified by 81 in FIG. 3) are not spatially organized. Parcelization may provide advantages for these kinds of data as well. Place data 63 are among the kinds of data that are not spatially organized. Instead, place data 64 are organized by hierarchy. As mentioned above, place data 63 includes place data entities 145 (in FIG. 5) which are used to represent administrative areas, zones, settlements, and so on. Place data 63 are organized in a hierarchical manner that takes into account the administrative levels of the places represented by the data. Once the place data records 145 are organized in this hierarchical manner, they are formed into parcels 120 (in FIG. 7). (Since the place data entities are not spatially organized, each parcel of place data does not necessarily correspond to any of the rectangular areas 119 in FIG. 6.)

According to one embodiment, all the level 1 place data records (i.e., those corresponding to the "countries" whose geographic features are represented by the geographic database 30) are included first. If more than country is represented by the geographic database (e.g., Canada and the United States), the level 1 records are ordered alphabetically.

Next, all the level 2 place data records (i.e., those corresponding to the "states" in the U.S. or "provinces" in Canada) whose geographic features are represented by the geographic database 30 are arranged. These place records are ordered first according to which of the countries represented by level 1 records they are a part of, and then once they are sorted by country, they are sorted alphabetically. Thus, if the geographic database includes Canada and the United States, all the place data records that represent provinces of Canada are arranged in alphabetical order first followed by all the place data records that represent states of the United States arranged in alphabetical order. (Note that the geographic database does not necessarily include all the states or all the provinces. Only those that are represented by the geographic database are included.)

Next, all the level 3 place data records (i.e., those corresponding to the "counties" in the U.S. and Canada) whose geographic features are represented by the geographic database 30 are arranged. These place records are ordered first according to which of the states (or provinces) represented by level 2 records they are a part of, and then alphabetically. Thus, if the geographic database includes Illinois and Iowa, all the place data records that represent counties of Illinois are arranged in alphabetical order first, followed by all the place data records that represent counties of Iowa arranged in alphabetical order.

Finally all the level 4 place data records (i.e., those corresponding to the "cities" in the U.S. or Canada) whose geographic features are represented by the geographic database 30 are arranged. These place records are ordered first according to which of the states (or provinces) represented by level 2 records they are a part of, and then alphabetically. Thus, if the geographic database includes Illinois and Iowa, all the place data records that represent cities of Illinois are arranged in alphabetical order first, then followed by all the place data records that represent cities of Iowa arranged in alphabetical order.

Place data may be indexed in at least two ways. First, there is a B-tree index for the hierarchically organized place data described above. The key in this B-tree index is a place data record identification number plus the place name. (In a present embodiment, the place data record identification number consists of a combination of the identification number of the parcel in which the place data record is contained and a record number for the place data record within the parcel.) This B-tree facilitates searching alphabetically for places under a certain parent in the hierarchy (e.g., cities in Illinois that begin with "C"). Second, there is an index (including a B-tree) of place data record identification numbers ordered alphabetically by level in the hierarchy. The index information includes the place data record identification number, a portion of the place name, and a language bitmap (which is described in more detail below). This index facilitates searching alphabetically for places at a certain level (e.g., all cities that start with "C"). Each of these indices are organized as a B-tree of minimal height, with the root of the index kept in memory, and with index page sizes such that a place record can be found with a minimal number of reads of index records (preferably, a single read), followed by a read of a place parcel.

The parcelization of place data described above represents one way that these data records can be organized. Other kinds of organization may be used. For example, other kinds of hierarchical arrangements may be used for the place data. Alternatively, the place data records may be spatially organized like the point of interest data.

VI. Provision for Multiple Names

A. General.

As mentioned above, the geographic database 30 supports alternative names for locations, such as points of interest and places. The geographic database may contain data that represent geographic features in several countries, each of which has its own language. Therefore, these alternative names may include different names in different languages for the same location, as well as different names in the same language for the same location.

A country's official or most common language is the default language of the country. Each place or POI has a preferred name, known as its "base name." This name is usually, though not necessarily, in the language of the country in which the place or POI is located. Each point of interest has a POI data record 125 corresponding to the base name of the point of interest. Likewise, each place (e.g., administrative area, settlement, etc.) has a place data record 145 corresponding to the base name of the place.

Different names for the location in languages other than the language of the base name are referred to as "exonyms" for the location. Each exonym of a point of interest has a POI data record 125 corresponding to the exonym name of the point of interest in the language other than the default language. Likewise, each exonym of a place has a place data record 145 corresponding to the exonym name of the place in the language other than the default language.

Different names for the location in the default language are "synonyms" for the location. Each synonym of a point of interest has a POI data record 125 corresponding to the synonym name of the point of interest in the default language. Likewise, each synonym of a place has a place data record 145 corresponding to the synonym name of the place in the default language.

A location may have multiple synonyms in its default language. For example, a point of interest has one POI record 125 corresponding to its base name and may have one or more additional POI records 125 corresponding to its synonym names in its default language. Likewise, a point of interest may have one or more additional POI records 125 corresponding to its exonym names in languages other than its default language. In a present embodiment, each point of interest and each place may have not more than one exonym data record (125, 145) in each of the languages other than the default language which are supported by the geographic database 30. However, in an alternative embodiment, the geographic database 30 may include more than one exonym name in one or more of the languages other than the default language. (Places may have the same alternative synonym name records and exonym records as POI names.)

Abbreviations may be treated as synonyms in the geographic database 30. They are used for places or for points of interest, or both. In a present embodiment, abbreviations are used only for places.

B. The POI parcel

Within a parcel, POI records may be organized by any suitable means. According to one embodiment, the POI records are organized by POI name. For example, according to this embodiment, all the POI records in the region 112 depicted in FIG. 6 are first separated into groupings that correspond to each of the rectangular areas 119, and then within each of these groupings, i.e., which corresponds to a parcel, the POI records for each for these separate groupings are then arranged alphabetically by the name of the point of interest. Then, a POI identification number ("ID") is assigned to each POI record in an ordering based first on the ordering of the parcels and within each parcel alphabetically. Within a parcel, POI records may be accessed by their POI identification numbers. Also, POI records may be stored in compressed form within a parcel.

Each alternative name (i.e., base name, synonym, exonym) by which a point of interest is known has a corresponding point of interest data record 125 among the POI data 54. Thus, if "O'Hare Airport", "O'Hare International Airport", and "ORD" are all alternative names by which Chicago's main airport is known, each of these would be represented by a separate point of interest data record 125. In addition, each foreign name (i.e., exonym) by which "O'Hare Airport" is known would also have its own POI data record 125 in the POI data 54.

All of the POI data records 125 which represent alternative names by which a point of interest is known correspond to the same geographic coordinates. Because POI data 54 are organized spatially, all of the POI data records 125 which represent alternative names by which a point of interest is known are located together among the POI data 54. Since POI data are spatially parcelized, all the POI data records that represent the same point of interest are contained in the same parcel 120 (of FIG. 7) of POI data 54. This arrangement is illustrated in FIG. 8. Specifically, the base name POI record, the exonym POI records (if any), and the synonym POI records (if any) which refer to the same point of interest are located physically and logically together in the same parcel 120 among the POI data 54. This follows because each of these records refers to the same physical location in the geographic region.

Only the POI data record 125 that corresponds to the base name of the point of interest includes all the actual information (if such information is present in the database) corresponding to each of the attributes or fields (126–136 in FIG. 4) associated with the POI data record. Each of the POI data records that corresponds to a name other than the base name of the point of interest (i.e., exonyms, synonyms) points to the POI record corresponding to the base name and may include pointers to the corresponding common attributes in the POI data record corresponding to the base name. This enables these POI records to share common data attributes thereby reducing storage requirements. As mentioned above, all the POI data records which represent different names by which a point of interest is known are in the same POI parcel. Therefore, using pointers in the exonym POI records and synonym POI records to refer to the base name POI record for the POI attributes need not incur a significant performance penalty since the base name POI record is in the same parcel as its exonym records and synonym records and is accessed at the same time as any exonym POI records and synonym POI records that point to it.

In a preferred embodiment, the base name POI record 125 also points to all the synonym and exonym POI records that correspond to the same point of interest. This allows a query from the navigation application for all alternative names for a given point of interest, regardless of the language, to be satisfied.

C. The language filter index

As mentioned above, it is preferred that the geographic database support more than one language. It is preferred that names for locations in languages other than the language selected by the end-user are not presented to the end-user since these names may not be meaningful to the end-user. However, many names for locations are the same in different languages. Accordingly, a means is provided that prevents names in languages other than the preferred access language selected by the end-user to be provided to the end-user while accommodating names that are used to refer to a location in more than one language.

Figure 9:
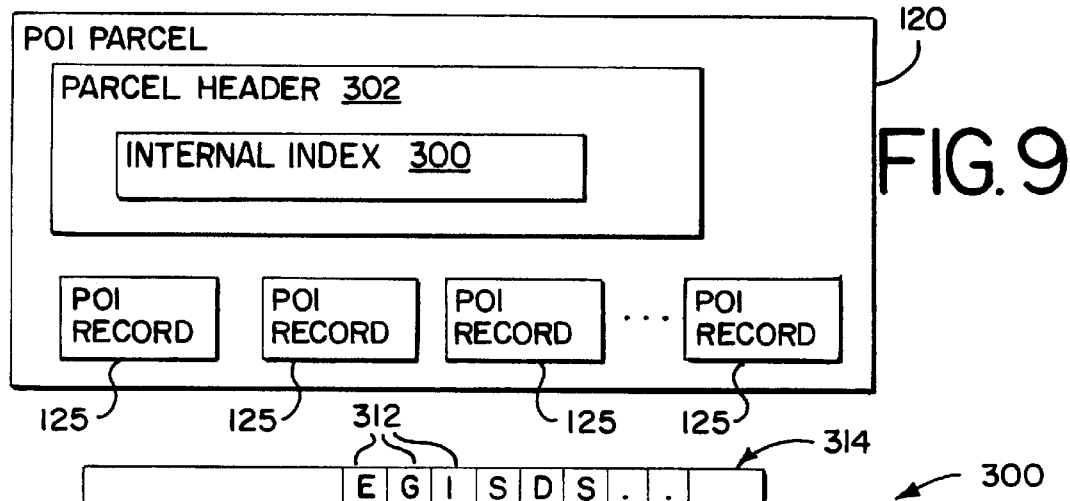
FIG. 9 is another diagram illustrating components of one of the parcels shown in FIG. 7 that contain point of interest data.
Figure 10:
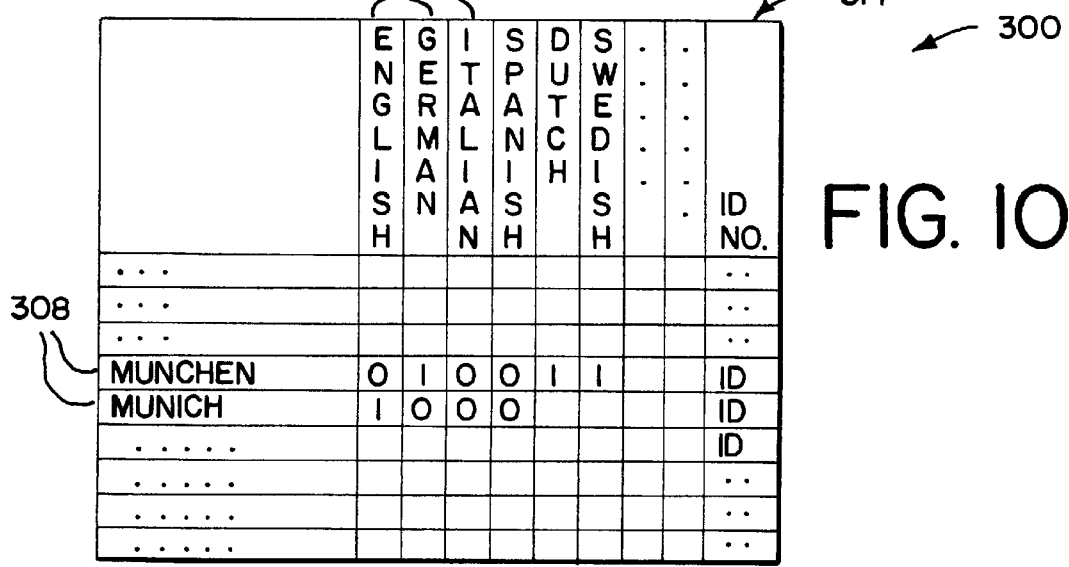
FIG. 10 shows an index included in the point of interest parcel of FIG. 9.

Referring to FIGS. 9 and 10, each POI parcel includes an internal index 300. The index 300 may be located in a header 302 of the parcel so that it can be read first when the parcel is accessed. The index 300 may be in the form of a table, a bitmap, or other data structure. As shown in FIG. 10, the index 300 is in the form of bitmap. The index 300 functions as a language filter to restrict POI records so that only those records which correspond to the end-user's selected access language are returned.

The index 300 includes entries 308 for each of the point of interest records 125 included in its corresponding parcel 120. Each entry 308 in the index 300 is associated with an n bit word or field 310. In a present embodiment, each bit corresponds to one of the languages 312 supported by the geographic database. Thus, in a present embodiment wherein the geographic database supports eight languages, there are eight bits 310 (i.e., n=8) associated with each of the entries 308 in the index 300. In alternative embodiments, fewer or more than eight languages may be supported by the geographic database and if so a corresponding lesser or greater number of bits may be used in the index 300. (Alternatively, the geographic database may support fewer languages than the number of bits, and the extra bits may be used for other purposes or remain unused. In still a further embodiment, the geographic database may support more languages than the number of bits associated with each of the entries 308. This may be accomplished by using one of these bits as an escape bit to reconfigure the languages associated with each of the remaining bits.)

For each entry 308 in the index 300, at least one of the bits 310 is set on (where "on" is represented by a "1" in the index 300 of FIG. 10). A bit set to "1" (i.e., "on") indicates that the name corresponding to the POI record 125 associated with the entry 308 is valid in the language 312 associated with the bit. The same exonym name for a point of interest may be valid in more than one language. However, there are separate entries 308 for each of these names in the index 300. Each of these entries 308 includes one bit set to "1" corresponding to its access language. The name (and the corresponding POI record 125 in the parcel associated with the index 300) can be used when that language is selected. When a language has a "0" bit set for an entry, it means that the name is not valid in that language.

A location may not have an exonym in an access language. This may occur because there is no exonym for the location in the access language, because the name for the location is the same in the access language as in the default language, or because the geographic database does not include a record for the exonym. If the point of interest does not have an exonym in an access language, the base name of the point of interest is used for that language and a bit is set for that language for the base name entry 308 in the index 300.

The index 300 facilitates use of and access to the POI data records 125 in the parcel 120 in the selected access language. Referring to FIG. 2, a program or routine 610 is used with the navigation application 18 to access the parcels. This program 610 can be written in any suitable computer programming language such as C. This program 610 can use the index 300 to quickly eliminate from consideration all POI records in the parcel except those for which a bit is set "on" in the selected access language. Then, using the index 300, the POI records 125 for which a bit is set "on" in the selected access language can be further examined or processed. The POI records 125 for which the bit is set to "1" in the access language can be located in the parcel by a record identification number (e.g., "ID 314") associated with each of the entries 308 in the index 300. The ID 314 provides a means for addressing or finding the POI record 125 in the parcel. The ID 314 may be in the form of an offset into the parcel by which the POI record can be found. (The ID 314 may correspond to the parcel ID 136 of FIG. 4.) By using the ID 314 in conjunction with the access language bits 310, the POI records 125 that are valid in the selected access language can be selected and used. The POI records which are not valid in the selected access language are filtered out and not used.

The use of the index 300 provides advantages in that the POI records which are not valid in the selected access language do not have to be processed and examined. This eliminates unnecessary computation and processing associated with these records that may detract from navigation system performance. In addition, the POI records 125 in the parcel 120 may be in a compressed form. By using the index 300 to eliminate from consideration the POI records which are not valid in the selected access language, the computation and processing associated with de-compressing these records is avoided. Locating the index 300 in the header 302 of the parcel facilitates this elimination process since none of the POI records 125 need to be decompressed until the index 300 is used to determine which of them are valid in the selected access language.

D. The external language filter index

In addition to the internal indices 300 included in each of the POI parcels 120 which are used to filter POI data records 125 so that records representing names that are not valid in the access language are filtered out, there may be one or more additional indices that also provide this filtering function. These one or more additional indices may be external indices 400 associated with the POI data 54. These indices 400 are external indices because they are not necessarily included in the parcels 120 that include the POI data 54. Instead, these external indices 400 may be included elsewhere in the geographic database 30.

These one or more external indices 400 are not necessarily spatial indices and therefore may be included among the non-spatial indices 71 of FIG. 2. For example, one of these indices may categorize all the POI records by type (e.g., all hotels together, all restaurants together, and so on). Another of these indices may categorize all the POI records by place (e.g., all points of interest in Chicago, all points of interest in Detroit, and so on). Still another of these indices may categorize all the POI records by type and place (e.g., all hotels in Chicago, all restaurants in Detroit, and so on). Other indices of the point of interest data may also be provided.

Figure 11:
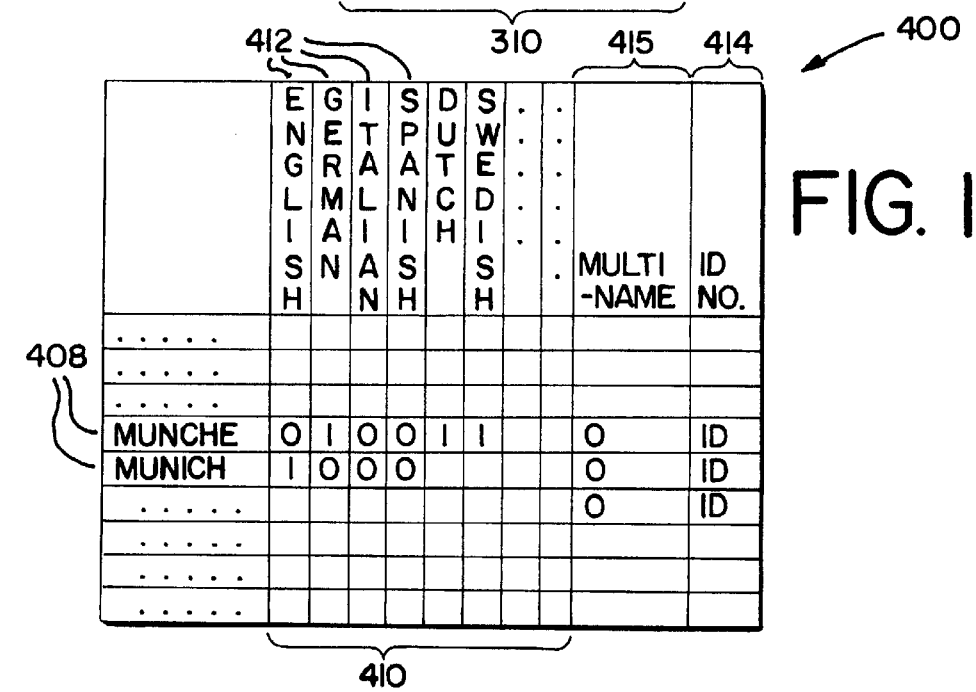
FIG. 11 is a diagram illustrating an external index for the point of interest parcel of FIG. 3.

In a present embodiment, one or more of these external indices may include a language filter similar to the internal index 300 of FIG. 10. FIG. 11 shows an embodiment of one of these external indices 400. Like the internal index 300, the external index 400 may be in the form of a table, a bitmap, or other data structure. The external index 400 functions as a language filter to restrict POI records so that only those that records which correspond to the end-user's selected access language are returned.

The index 400 includes entries 408 for each of the POI records 125 included in all the parcels 120 of POI data 54. Each entry 408 in the index 400 is associated with an n bit field 410, where each bit corresponds to one of the languages supported by the geographic database. As in the internal index 300, at least one of the bits 410 is set to "on" for each entry 408 in the index 400 to indicate that the name corresponding to the POI record 125 associated with the entry 408 is valid in the language associated with the bit. The external index 400 is used in manner similar to the internal index 300. The function 610 used with the navigation application program 18 employs a user-selected access language selection to filter out all POI entries 408 in the index 400 that are not valid in the selected access language. This can easily be accomplished because only those entries 408 that have the corresponding language bit set "on" in the selected access language are valid. All other entries are filtered out.

Like the internal index 300, each entry 408 in the external index 400 includes a reference to a corresponding POI record identification number (i.e., "ID 414") that identifies the POI record 125 that represents the point of interest by the name associated with the entry 408 in the index 400. However, the POI ID reference 414 in the external index 400 is also used to identify the parcel 120 in which the POI record is located as well as the position of the POI record 125 within the parcel.

In a present embodiment, the entire name of the point of interest may not be included in the external index 400. Instead, only the first six characters of the name of the point of interest may be provided. In order to provide the rest of the name to the end-user, the parcel in which the POI record is located is accessed. Then, the entire name of the point of interest may be obtained by reading the entire parcel or just the header 302 where the entire name is included in the internal index 300.

The external index 400 may also include a field 415 associated with each of the entries that indicates whether the name 408 of the entry is part of a multi-word name, such as "New York City" or "Iowa City." In a present embodiment, each word in a multi-word name has a separate entry in the index 400.

Like the internal index, the external index 400 provides for quick filtering, of names that are not valid so that computational resources are not wasted examining these unnecessary records. In this case, these computational resources include loading the POI record parcels into memory. This may provide for improved navigation system performance.

These external indices 400 may be maintained in memory and may be used to determine which of the POI parcels 120 to access and read in order to satisfy a request for data from the navigation application program 18. These external indices 400 may be used in conjunction with the internal indices 300 to first ascertain which POI parcel includes the POI records needed to satisfy a request for data from the navigation application program 18 and then to determine which of the POI records within the selected parcel should be de-compressed and returned to the navigation application program 18.

E. The place data parcels and place internal and external indices.

Figure 12:
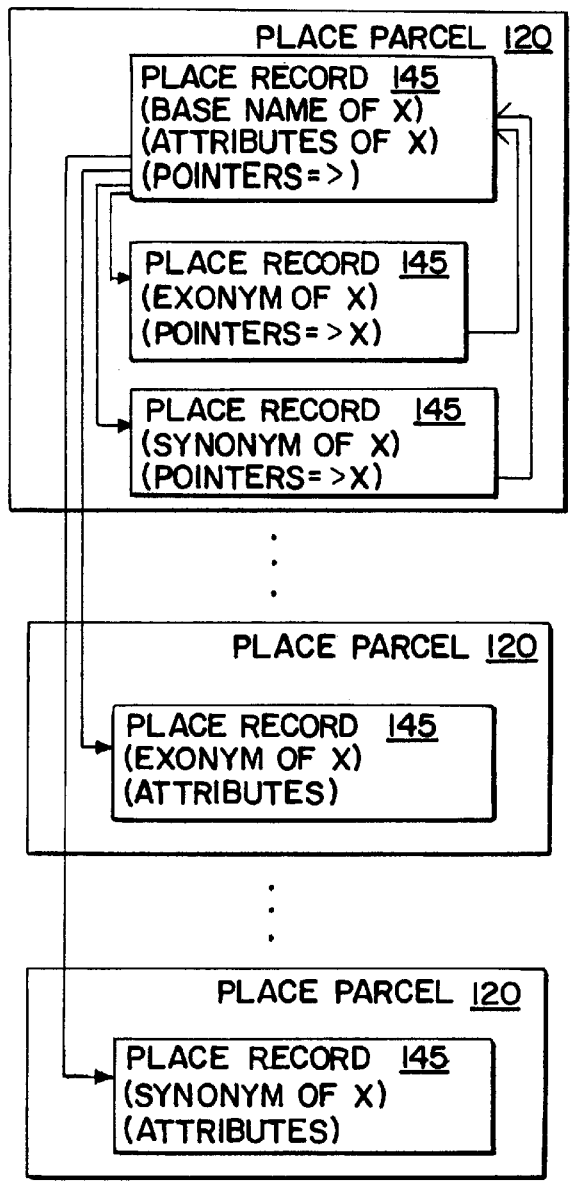
FIG. 12 is a diagram illustrating several place records in several parcels containing place data as shown in FIG. 7.
Figure 13:
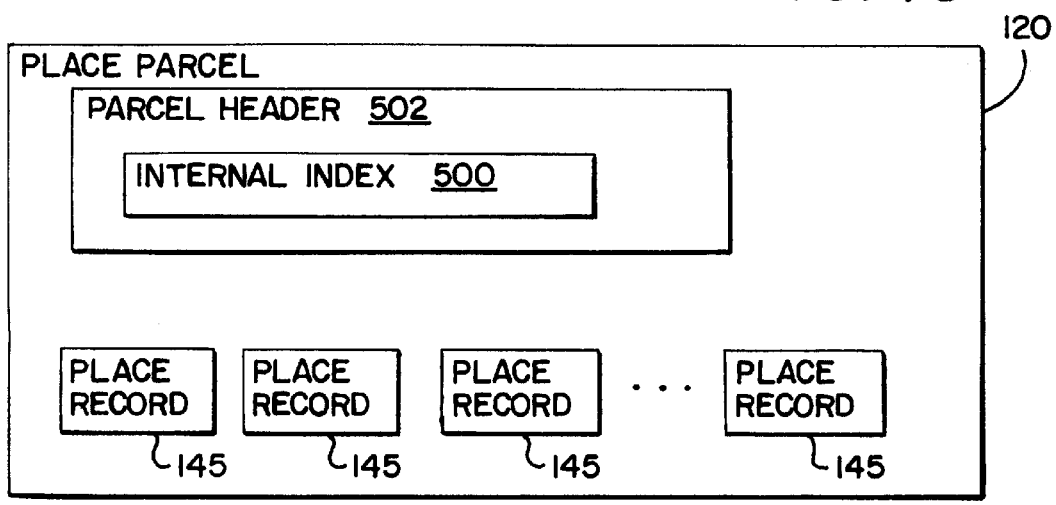

As mentioned above, the place data records 145 are not organized spatially, but instead are organized in the hierarchical order described above. Therefore, the different place data records (i.e., base name, exonyms, synonyms) that represent the same place may not be contained in the same parcel 120 of place data 63. This arrangement is illustrated in FIG. 12. A place data record 145 that corresponds to the base name of the place includes all the actual information (if present in the database) corresponding to each of the attributes or fields (146–159 in FIG. 5) associated with the place data record 145. An exonym place data record or a synonym place data record located in the same parcel of place data as the place data record for the base name may include pointers to the corresponding common attributes in the place data record for the base name. If a place record for an exonym or synonym is located in a parcel other than the parcel in which the place data record for the base name is located, all the attributes 146–159 associated with the place data record are included with the place record for the exonym or synonym. This avoids having to load more than one parcel to obtain this information. (If several exonym or synonym place records are located in the same parcel other than the parcel in which the place data record for the base name is located, one of these may include all the attributes 146–159 associated with the place data record and the remainder of the exonym or synonym place records in the same parcel may include pointers to it.)

In a preferred embodiment, the base name place record 145 also points to all the synonym and exonym place records 145 that correspond to the same place. This allows a query from the navigation application for all alternative names for a given place, regardless of the language, to be satisfied.

Like POI parcels, each of the place data parcels may include an internal index 500. This internal index 500 is preferably located in a header portion 502 of each parcel that contains place data records. The index 500 may be a table, a bitmap, or other data structure. The internal index 500 includes entries for each of the place records in its associated parcel. The internal index 500 may be similar or identical to the internal index 300 for POI data records which is included in each of the POI parcels and which is described above in connection with FIG. 10. Further details of the internal index 500 for places are therefore not repeated. Like the internal index 300 for POI data records, the internal index 500 for place records filters out the place records that are not valid in the selected access language. This reduces unnecessary computation associated with place records thereby possibly improving navigation system performance.

In addition to the internal indices 500, there may be one or more additional external indices for the place data just as there are for the POI data. These one or more external indices for the place data may 63 be similar to the external indices 400 for the POI data 54, as described above. For example, the external indices may include the index of place record identification numbers ordered alphabetically by level in the hierarchy, as described above. These one or more of these external indices for place data provide a language filter function in a manner similar to the embodiments described above. A reference in the external index for place data identifies the parcel of place data in which the desired data is located while filtering out the place records that are not valid in the selected access language.

F. Methods of operation

Referring to FIGS. 1 and 2, in order to provide support for alternative languages, a routine 600 is provided in the navigation application 18 that prompts the end-user to select a preferred language. This routine 600 may be part of the user interface portion 33 of the navigation application 18. The prompt may be provided to the end-user via the user interface 31. The prompt may be provided in the form of a menu selection that the end-user can access using the user interface 31. According to one example, a menu on the display screen 27 prompts the end-user to "SELECT LANGUAGE." When the end-user chooses this menu selection, another menu is presented on the display screen 27 that provides the end-user with a list of optional languages from which the end-user can select one language. For example, in one embodiment, the languages include English, Spanish, French, German, Italian, Portuguese, Japanese, Chinese, Swedish, among others. In one embodiment, there are eight languages from which the end-user may select, although in alternative embodiments, these may be more or fewer. In still further embodiments, there may be eight languages from which the end-user may choose, but the eight may be selectable from among even more languages.

Upon selection of a language, the navigation application 18 stores data that indicates the end-user's selection. This data may be stored among the parameters 19 in the non-volatile memory 16 which is part of the navigation system 10.

In a present embodiment, whenever the access language is changed or whenever the navigation system is turned on, the function 610 checks the data that indicates the selection of the access language by the end-user. If the end-user does not select an access language, the function 610 defaults to the language of the country in which the vehicle is located.

In a preferred embodiment, the function or routine 610 allows the navigation application 18 to access database records from the database 30 in only a single language at a time. All tasks from the navigation application 18 share the access language. (Access to the database in only a single language at a time corresponds to a preferred or default mode of operation of the function 610. It is also preferred that the function 610 allow the end-user to override this default mode of operation and obtain database records in more than one language at a time. In an alternative embodiment, the end-user may be able to select more than one language or even all languages, if desired.)

The function 610 operates in conjunction with certain of the requests for data from the navigation application. Specifically, it operates in conjunction with queries in which data records are returned that represent names of locations (e.g., POI records and place records). The function 610 uses the language filter structures 300 and 400 for POI data and the corresponding language filter structures for the place data to return only names of locations that are valid in the selected access language. As mentioned above, the language filters return the base name of the location if there is no name for the location in the selected access language. The function 610 returns results that are valid only in the selected access language. The function 610, using the language filters, masks or suppresses names that are not valid in the selected access language.

In a present embodiment, when returning POI data records, if the preferred language is the default language of the point of interest, then all synonyms of the POI are also returned. The reason for this is that if the result is used for displaying or for finding the nearest point of interest (from a spatial search), then it does not matter to include synonyms. If the results are used for a pick-list, then all synonyms should be included because it cannot be assumed that the end-user's desired selection can be recognized from the base name, for example, "NATURAL HISTORY MUSEUM" from "FIELD MUSEUM OF NATURAL HISTORY." As a consequence, some synonyms may be returned which are redundant descriptions, for example, "O'HARE AIRPORT" and "O'HARE INTERNATIONAL AIRPORT".

VII. Alternative Embodiments

In the embodiments disclosed above, support for alternative names and different languages was described in connection with a navigation system. In alternative embodiments, the navigation system should be understood to include any computer-based system that provides navigation functions to an end-user regardless of hardware platform or architecture. For example, the navigation system may include any kind of portable system, such as hand-held systems or systems installed on personal digital assistants or personal computers. In alternative embodiments, the navigation system may include navigation application software installed on a personal computer, such as a desktop computer. Further, the navigation system may be implemented in various different environments, including networked environments and client-server platform environments. The navigation application program and the geographic database need not be located in the same location, but may connected over a network. The geographic database may be located remotely from the end user and the data transmitted to the end-user over a wireless network.

As mentioned above, according to one embodiment, there is a separate data record in the point of interest data (and the place data) for each exonym name in each language other than the default language even though the exonym name may be the same in more than one of these languages. In an alternative embodiment, a single data record may be included for an exonym that is valid in more than one language other than the default language. In the case of this alternative embodiment, the language filter index (or indices) would have a bit set for the entry for this single data record for each of the languages for which the exonym is valid.

In the embodiments described above, the terminology used to refer to names of locations included "points of interest" and "places." Other terminology may be used to refer to either or both of these kinds of locations, and it is understood that the subject matter disclosed herein is not intended to be limited to any particular terminology that expresses similar concepts.

Also, although it is preferred to use the language filter index with both points of interest and places, it is understood that the language filter can be used with data that represents only one or the other of these kinds of named locations.

It is intended that the foregoing detailed description be regarded as illustrative rather than limiting and that it is understood that the following claims including all equivalents are intended to define the scope of the invention.

We claim:

1. A method of supporting alternative names of geographic locations using a navigation application program, wherein the geographic locations are represented by data records in a geographic database stored on a computer readable medium, wherein the method comprises the steps of:

providing data in said geographic database that indicates alternative names for said geographic locations;

providing a language filter that indicates which of said alternative names are not valid in an access language;

accepting a selection of a preferred access language;

applying said selection to said language filter to suppress those of said alternative names that are not valid in said selected access language; and returning data records in response to queries, wherein said data records do not include names that are not in said selected access language.

2. The method of claim 1 wherein the step of accepting a selection of a preferred access language is further characterized as selecting an access language from a predetermined plurality of access languages.

3. The method of claim 1 wherein the data records are spatially organized in said geographic database.

4. The method of claim 1 further comprising the step of:
providing data associated with each of said alternative names for locating data representing each of said geographic locations.

5. The method of claim 1 wherein said alternative names include exonyms and synonyms.

6. A computer usable medium having computer readable program data structure means embodied therein for use in a map database, wherein the map database includes a plurality of data records representing geographic features in a geographic region, said plurality of data records including alternative names for said geographic features represented by said plurality of data records and wherein said alternative names include names in a plurality of different languages, said computer readable program data structure comprising:
a first language filter adapted for selecting those data records associated with those alternative names for the geographic features represented by the plurality of data records that are valid in a selectable language and for suppressing those data records associated with those alternative names for the geographic features represented by the plurality of data records that are not valid in the language.

7. The method of claim 6 wherein said alternative names include exonyms and synonyms.

8. A method of operating a navigation system comprising:
selecting an access language from a predetermined plurality of access languages;

using a navigation program to access data from a computer readable medium, wherein the data include names for geographic locations in a geographic region, wherein the names are in each of said predetermined plurality of access languages; and using a data filter to limit names used by the navigation program to withhold names that are not valid in said selected access language.

9. The method of claim 8 further comprising the step of:
after selecting an access language, storing an indication of said selection in a non-volatile memory of said navigation system.

10. The method of claim 8 wherein the data filter is used to suppress names that are in a language other than the selected access language.

11. The method of claim 8 wherein the data filter is used to suppress names that are in a language other than the selected access language unless there is no name for a location in the selected access language in which case the name of the location in the language of the country in which the location is located is not withheld.

12. The method of claim 8 wherein said names of locations comprise base names, synonyms for base names and exonyms for base names.

* * * * *